(12) United States Patent
Zhang et al.

(10) Patent No.: US 12,297,054 B1
(45) Date of Patent: May 13, 2025

(54) INTERMITTENT MOVING MECHANISM AND INTERMITTENT DIVERSION DEVICE

(71) Applicant: Southwest Jiaotong University, Chengdu (CN)

(72) Inventors: Zeqiang Zhang, Chengdu (CN); Haojie Ma, Chengdu (CN); Silu Liu, Chengdu (CN); Tong Tian, Chengdu (CN); Minjie Zhao, Chengdu (CN); Jie Li, Chengdu (CN); Lei Guo, Chengdu (CN); Yan Li, Chengdu (CN); Haolin Song, Chengdu (CN); Xingkang Wang, Chengdu (CN)

(73) Assignee: Southwest Jiaotong University, Chengdu (CN)

( * ) Notice: Subject to any disclaimer, the term of this patent is extended or adjusted under 35 U.S.C. 154(b) by 0 days.

(21) Appl. No.: 19/001,493

(22) Filed: Dec. 25, 2024

(30) Foreign Application Priority Data

Dec. 29, 2023 (CN) .......................... 202311848865.9

(51) Int. Cl.
*B65G 47/82* (2006.01)
(52) U.S. Cl.
CPC ................................... *B65G 47/82* (2013.01)
(58) Field of Classification Search
CPC ..................................................... B65G 47/82
USPC ........................................................ 198/348
See application file for complete search history.

(56) References Cited

FOREIGN PATENT DOCUMENTS

| CN | 105149080 A | | 12/2015 |
|---|---|---|---|
| CN | 108004909 B | | 5/2018 |
| CN | 108408385 B | | 8/2018 |
| CN | 210365613 U | | 4/2020 |
| CN | 212560244 U | | 2/2021 |
| CN | 213473657 U | | 6/2021 |
| CN | 216945385 U | * | 7/2022 |
| CN | 114852919 B | | 8/2022 |
| JP | 2018020416 A | | 2/2018 |

OTHER PUBLICATIONS

CN111776306 (Year: 2020).*
CN115417131 (Year: 2021).*
CN212892597 (Year: 2021).*

* cited by examiner

*Primary Examiner* — Gene O Crawford
*Assistant Examiner* — Lester Rushin, III
(74) *Attorney, Agent, or Firm* — Birchwood IP (57) ABSTRACT

Disclosed is an intermittent moving mechanism, which belongs to the technical field of conveying devices and includes a guide rail; a sliding block moving along the guide rail, two stop blocks arranged at intervals, wherein a distance between the two stop blocks is greater than a length of the sliding block along an extension direction of the guide rail, and the sliding block is positioned between the two stop blocks; and a reciprocating movement structure, configured to push the two stop blocks to move synchronously and reciprocally along an extension direction of the guide rail. The reciprocating moving structure in the intermittent mechanism continuously operates, which avoids repeated starting and stopping and speed changes of the prime mover, and is beneficial to reducing the operation energy consumption and reducing the noise pollution to the environment.

6 Claims, 14 Drawing Sheets

INTERMITTENT MOVING MECHANISM AND INTERMITTENT DIVERSION DEVICE

CROSS-REFERENCE TO RELATED APPLICATIONS

This application claims priority to Chinese Patent Application No. 202311848865.9, filed on Dec. 29, 2023, which is hereby incorporated by reference in its entirety.

TECHNICAL FIELD

The present invention relates to the technical field of conveying devices, in particular to an intermittent conveying device, and specifically to an intermittent moving mechanism and an intermittent diversion device.

BACKGROUND

In actual production life, factories generally use continuous conveying devices for material transportation, such as belt conveyors. In these devices, the processing of materials or products is usually completed during the continuous operation of the devices. However, in some application scenarios, the devices are required to perform operations such as taking and discharging materials within a specific time interval, that is, there must be an intermittent time in the material transportation process, that is, non-continuous movement, also known as intermittent movement.

Traditional intermittent mechanisms usually achieve intermittent operation by pausing the operation of continuous conveying devices. This requires a prime mover of the intermittent mechanism to start and stop repeatedly, and achieve the intermittent function by braking deceleration and driving acceleration, which causes the device to consume more energy during operation.

SUMMARY

To solve the above problems, the present invention provides an intermittent moving mechanism, whose a prime mover can be continuously operated without repeated starting and stopping, thereby reducing energy consumption.

The specific solution of the present invention is as follows:

an intermittent moving mechanism includes:
a guide rail;
a sliding block moving along the guide rail;
two stop blocks arranged at intervals, wherein a distance between the two stop blocks is greater than a length of the sliding block along an extension direction of the guide rail, and the sliding block is positioned between the two stop blocks; and
a reciprocating movement structure, configured to push the two stop blocks to move synchronously and reciprocally along an extension direction of the guide rail, so that the stop blocks are used to push the sliding block to move intermittently and reciprocally.

In a specific embodiment of the present invention, the intermittent moving mechanism further includes a damping component configured to hinder the movement of the sliding block, and a resistance applied to the sliding block by the damping component is less than a thrust applied to the sliding block by the stop block after abutting against the sliding block and is greater than a friction force between the guide rail and the sliding block, so that the stop block can push the sliding block to move after abutting against the sliding block, and the sliding block is stationary after the stop block is separated from the sliding block; and the stop block is fixed on the guide rail.

In a specific embodiment of the present invention, the intermittent moving mechanism further includes a second guide rail arranged parallel to the guide rail, wherein the two stop blocks are connected into a whole by a rigid support rod, and the two stop blocks move along the second guide rail together with a connecting body of the support rod.

In a specific embodiment of the present invention, the two stop blocks are connected into a whole by a rigid support rod, and the two stop blocks move along the guide rail together with a connecting body of the support rod.

In a specific embodiment of the present invention, a distance between the two stop blocks can be adjusted.

An intermittent diversion device includes:
a shell, wherein a Y-shaped passage is provided in the shell, and the Y-shaped passage includes a main pipe and two branch pipes communicated with the main pipe;
an adjusting shaft positioned at a junction of the main pipe and the branch pipe, wherein the adjusting shaft passes through the shell and is in a rotatable sealing connection with the shell;
an intermittent moving structure connected to one end of the adjusting shaft positioned outside the shell, and configured to drive the adjusting shaft to intermittently rotate forward and backward, wherein the intermittent moving structure is the intermittent moving mechanism disclosed above; and
a conical valve core fixedly connected to the adjusting shaft, wherein the conical valve core rotates synchronously with the adjusting shaft, so that the main pipe and the two branch pipes are intermittently and cyclically communicated.

Compared with the traditional continuous device, the present invention has the following advantages.

Energy saving and environmental protection: the reciprocating moving structure in the intermittent mechanism of the present invention continuously operates, which avoids repeated starting and stopping and speed changes of the prime mover, and is beneficial to reducing the operation energy consumption and reducing the noise pollution to the environment.

Wide application range: the intermittent mechanism of the present invention may be applied to various scenarios that require intermittent operation, such as material handling on an automated production line, and bag taking and bag placing in a packaging machine. This mechanism has a wider application range than the traditional continuous device.

High controllability: the intermittent mechanism of the present invention can achieve intermittent movement within a specific time interval, so that the precise control of material taking, material discharging and other operations can be achieved by controlling the time interval. This control method is more flexible and reliable than traditional continuous device.

in the drawings, 100: guide rail; 200: sliding block; 300: stop block; 400: reciprocating movement structure; 500: second guide rail; 600: damping component; 700: shell; 800: intermittent reaction kettle;

330: support rod; 410: motor; 420: first hinge rod; 430: second hinge rod; 610: first gear; 620: second gear; 710: Y-shaped passage; 720: adjusting shaft; 730: conical valve core; 711: main pipe; and 712: branch pipe.

DESCRIPTION OF EMBODIMENTS

The present invention is further described in detail below with reference to the embodiments and drawings; however, the embodiments of the present invention are not limited thereto.

Embodiment

Figure 1:
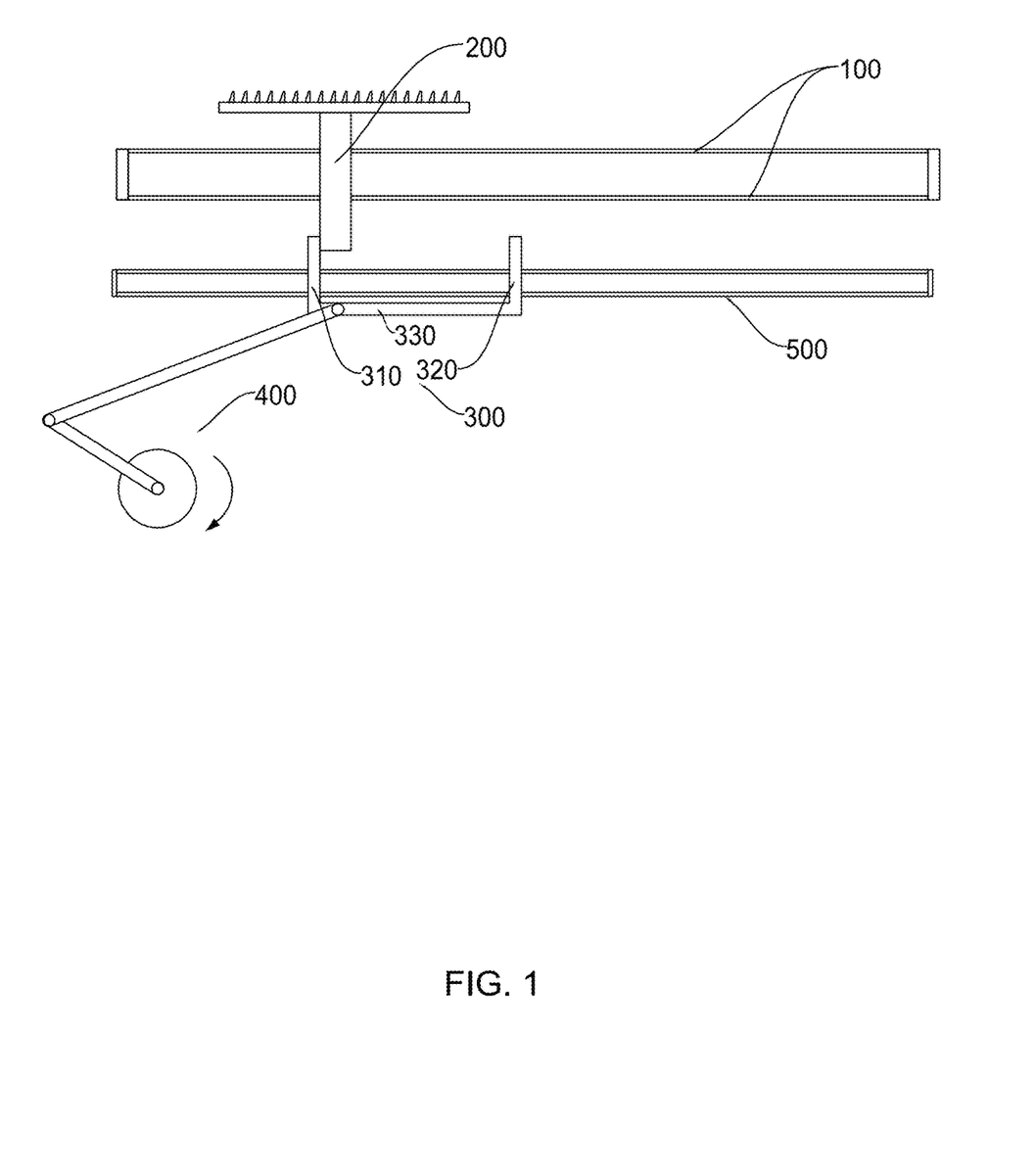
FIG. 1 is a schematic structural diagram of a specific embodiment of an intermittent moving mechanism according to the present invention.
Figure 2:
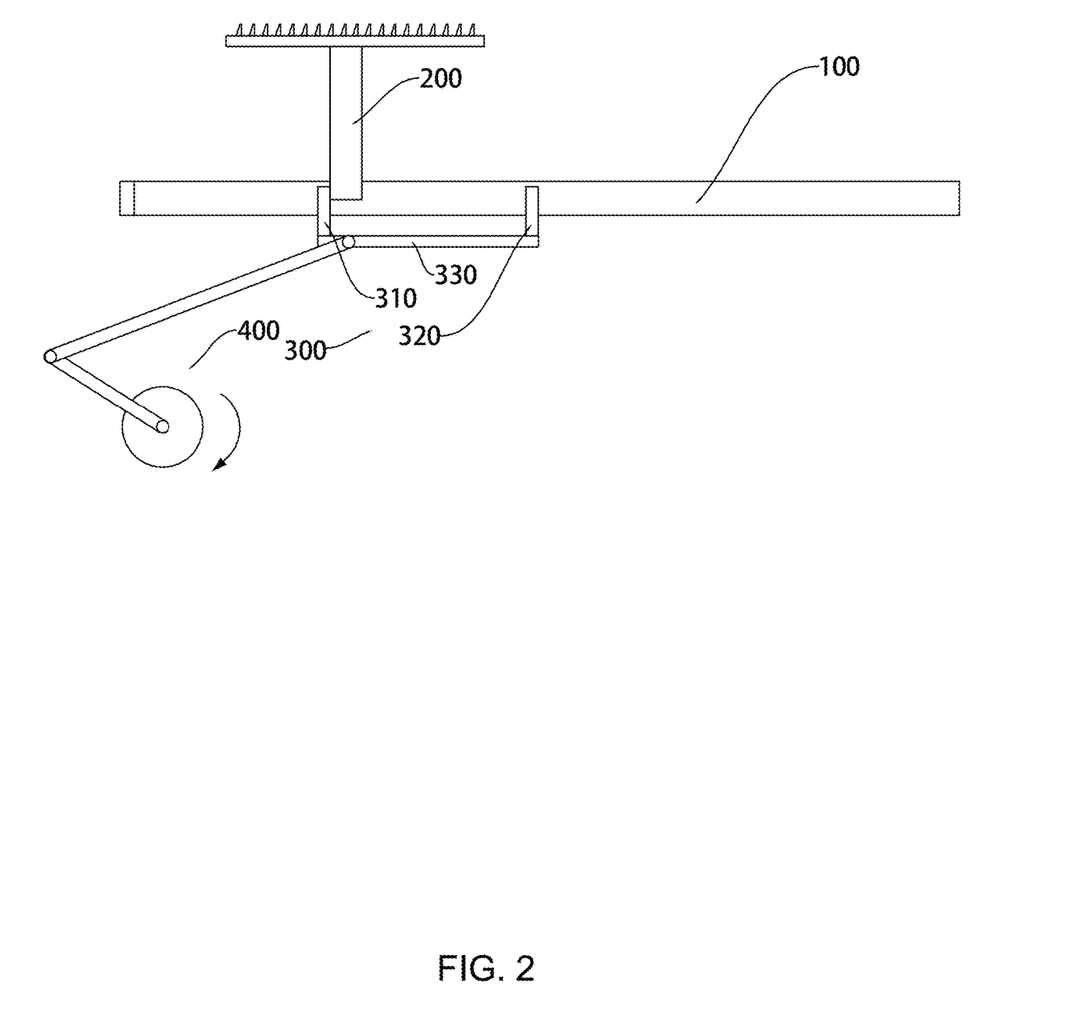
FIG. 2 is a schematic structural diagram of another specific embodiment of an intermittent moving mechanism according to the present invention.
Figure 3:
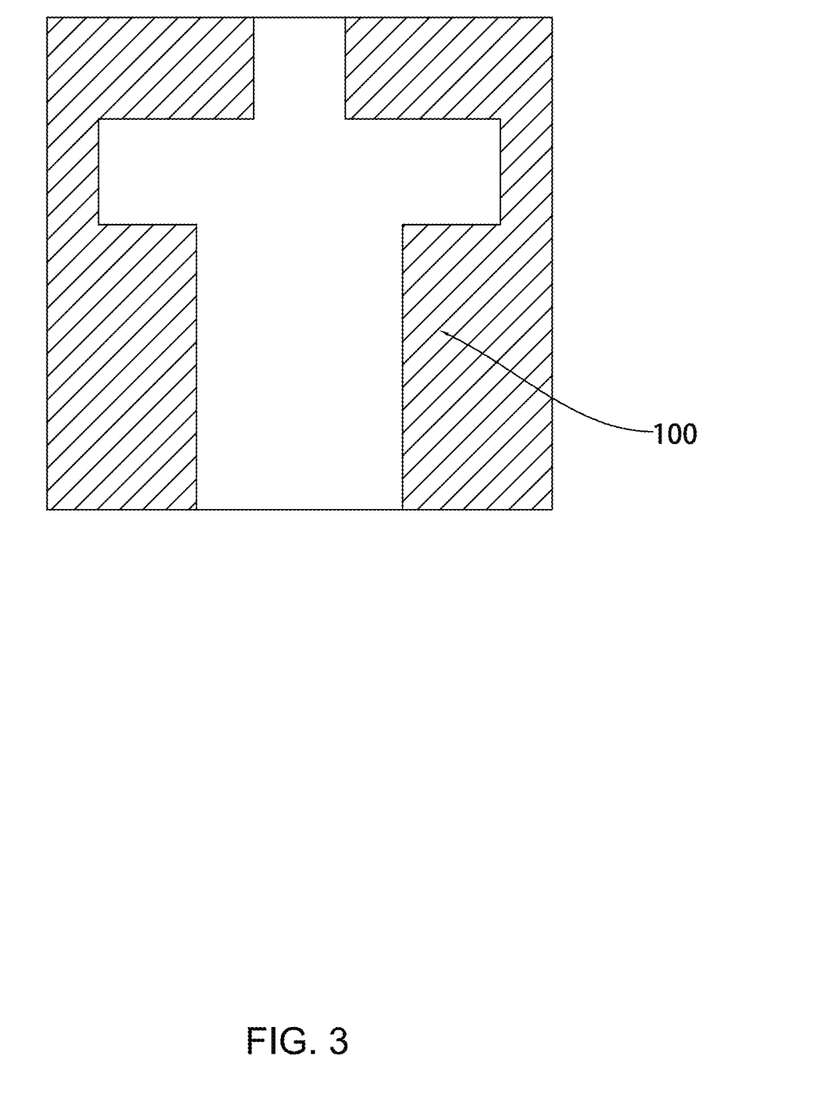
FIG. 3 is a schematic cross-sectional view of a guide rail in FIG. 2.
Figure 7:
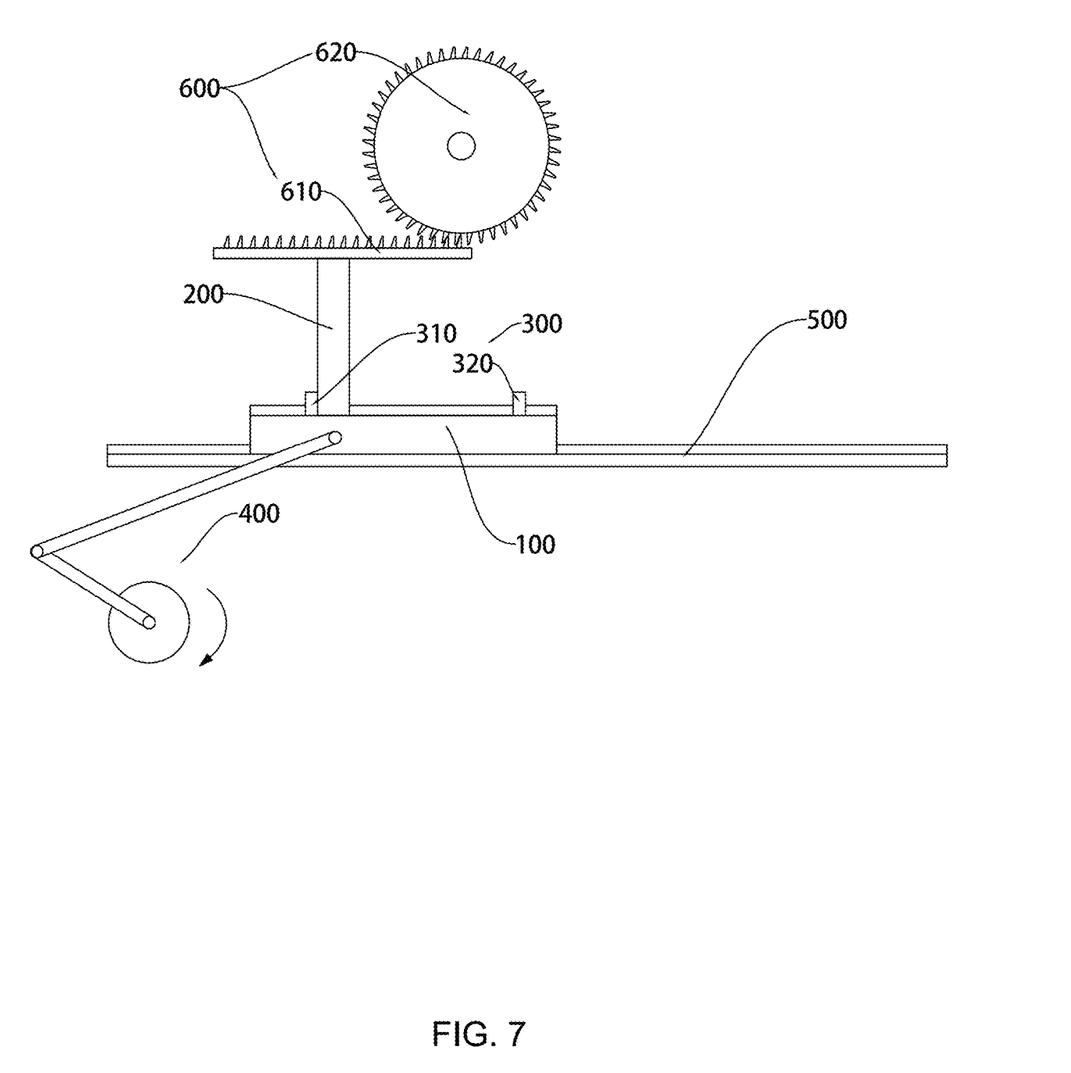
FIG. 7 is a schematic structural diagram of another specific embodiment of an intermittent moving mechanism according to the present invention.

Referring to FIG. 1, FIG. 2 and FIG. 7, an overall structure of three specific embodiments of the intermittent moving mechanism according to the present invention are shown. The intermittent moving mechanism of the present invention includes a guide rail 100, a sliding block 200, two stop blocks 300 and a reciprocating movement structure 400, wherein the sliding block 200 slides along the guide rail 100, the two stop blocks 300 are respectively a first stop block 310 and a second stop block 320, the two stop blocks 300 are arranged at intervals, a distance between the two stop blocks 300 is greater than a length of the sliding block 200 along an extension direction of the guide rail 100, the sliding block 200 is positioned between the two stop blocks 300, and the reciprocating movement structure 400 is configured to push the two stop blocks 300 to move synchronously and reciprocally along an extension direction of the guide rail 100, so that the stop blocks 300 are used to push the sliding block 200 to move intermittently and reciprocally. In the use process, when the stop block 300 moves in a forward direction, the first stop block 310 abuts against the sliding block 200 and pushes the sliding block 200 to move toward the second stop block 320, and when the stop block 300 moves in a backward direction, the second stop block 320 moves toward the first stop block 310 and finally abuts against the sliding block 200 and drives the sliding block 200 to move toward the first stop block 310, so as to reciprocally move the sliding block 200. Since the sliding block 200 is positioned between the two stop blocks 300, the stop blocks 300 move for a certain period of time before abutting against the sliding block 200 after switching a moving direction. During this period of time, the sliding block 200 is in a stationary state. Therefore, this period of time is the time when the sliding block 200 stops moving, that is, the intermittent time, also known as dwell time. In specific implementation, this dwell time can be used to perform related operations, such as loading and unloading goods, and disassembling parts.

Figure 4:
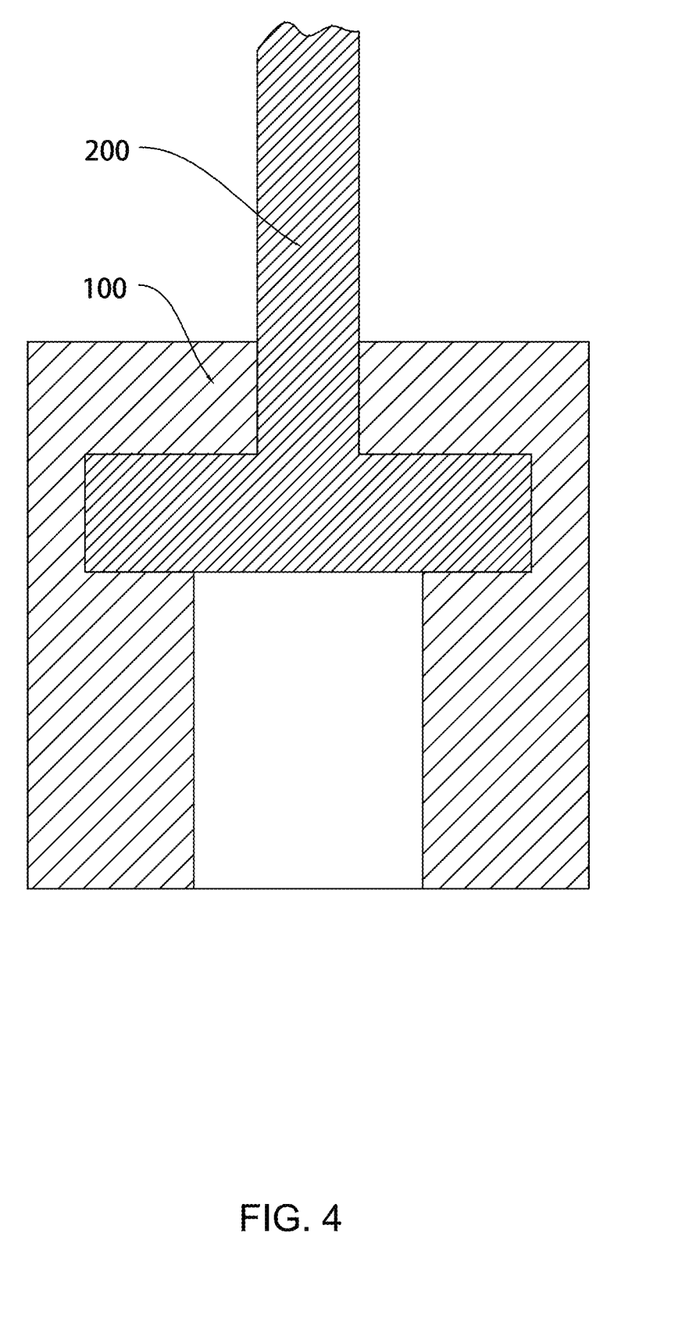
FIG. 4 is a schematic diagram of a connection structure between a guide rail and a sliding block in FIG. 2.
Figure 5:
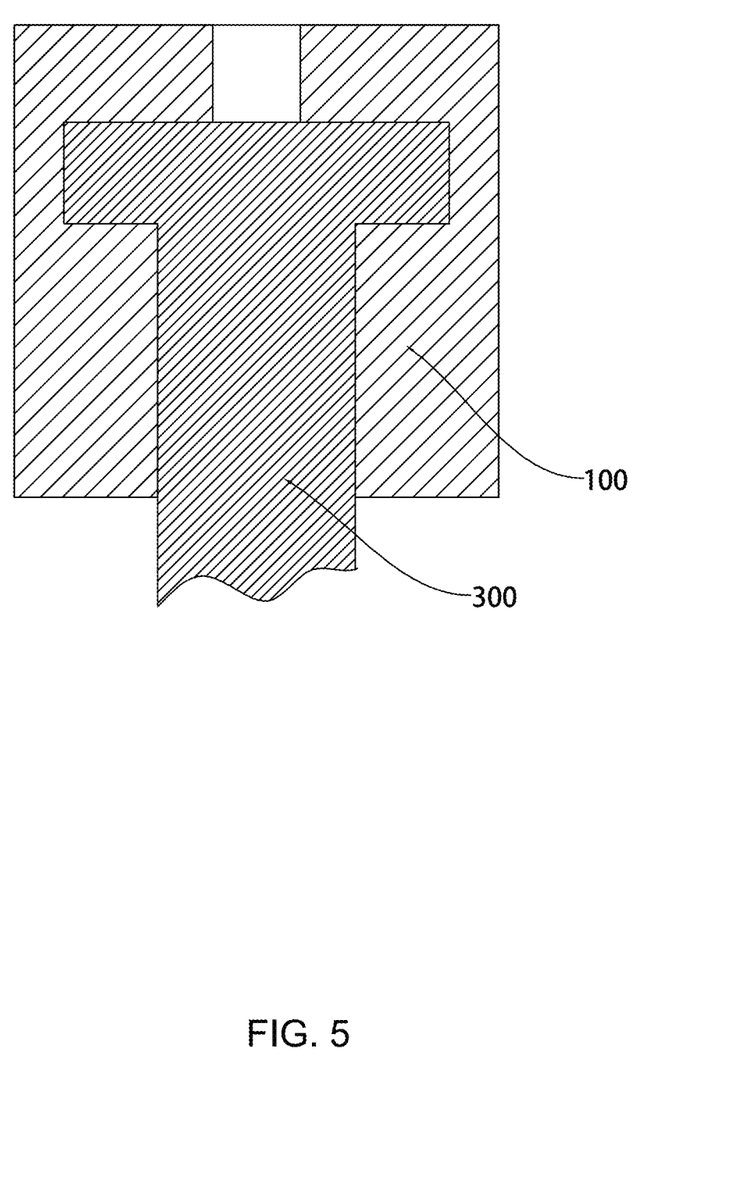
FIG. 5 is a schematic diagram of a connection structure between a guide rail and a stop block in FIG. 2.
Figure 6:
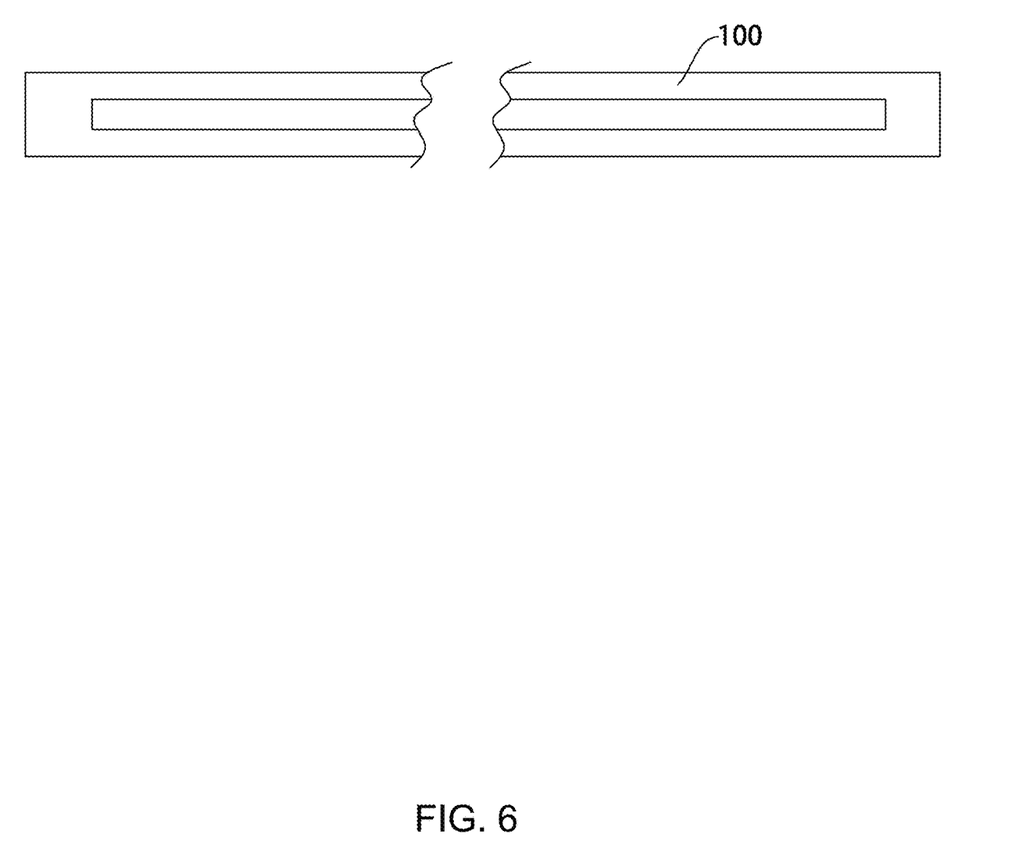
FIG. 6 is a top view of a guide rail in FIG. 2.

In the present invention, the sliding block 200 slides along the guide rail 100. There are many specific implementations. For example, in FIG. 1, a through hole is provided on the sliding block 200, the guide rail 100 is a smooth straight rod, the through hole on the sliding block and the guide rail are in clearance fit, the guide rail 100 is inserted into the through hole of the sliding block 200, and the sliding block 200 can slide along the guide rail 100. In specific implementation, to prevent the sliding block 200 from rotating along the guide rail 100, the through hole on the sliding block 200 can be configured as a non-circular shape, such as oval and rectangular. Of course, two or more parallel guide rails 100 can also be provided, and one through hole is provided on the sliding block 200 for each guide rail 100. Of course, the above configuration can also be achieved through other keyway connection forms, as shown in FIG. 4.

In the present invention, the stop block 300 is required to move synchronously and reciprocally along the extension direction of the guide rail 100, and there are many specific embodiments.

For example, in FIG. 1, two stop blocks 300 are integrally connected by a rigid support rod 330, and a second guide rail 500 is further provided, the second guide rail 500 is parallel to the guide rail 100, and the two stop blocks 300 move along the second guide rail 500 together with the connecting body of the support rod 330.

For another example, as shown in FIGS. 2 to 6, two stop blocks 300 are connected into a whole by a rigid support rod 330, and the two stop blocks 300 slide along the guide rail 100 together with the connecting body of the support rod 330. In this way, compared with FIG. 1, the device has a higher degree of integration, the second guide rail is eliminated, and the weight and volume of the device are reduced.

Figure 8:
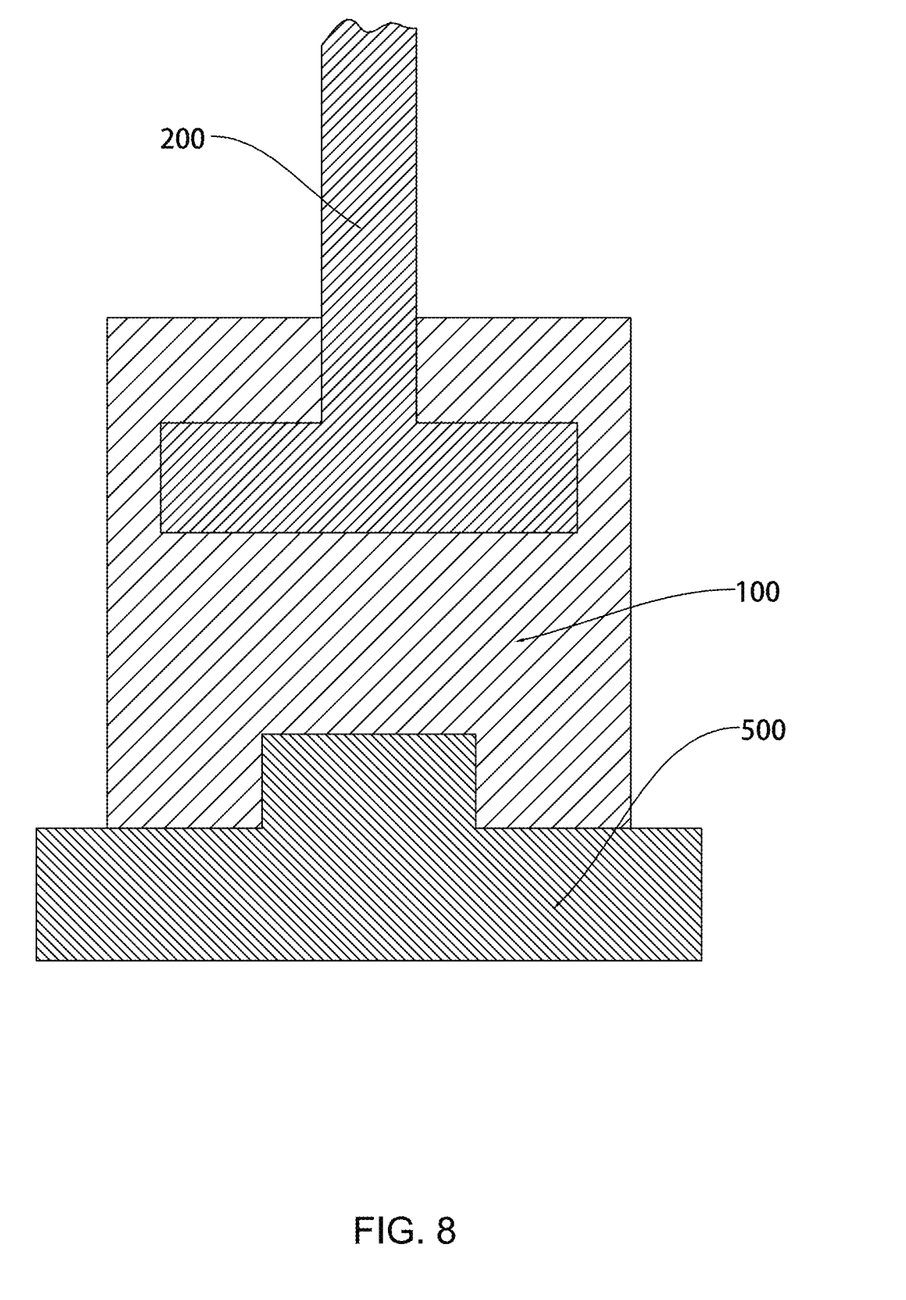
FIG. 8 is a schematic diagram of a connection structure among a guide rail, a sliding block and a stop block in FIG. 7.

In addition, in some embodiments, the intermittent moving mechanism further includes a damping component 600 configured to hinder the movement of the sliding block 200, and a resistance applied to the sliding block by the damping component 600 is less than a thrust applied to the sliding block 200 by the stop block 300 after abutting against the sliding block 200 and is greater than a friction force between the guide rail 100 and the sliding block 200, so that the stop block 300 can push the sliding block 200 to move after abutting against the sliding block 200, and the sliding block 200 is stationary after the stop block 300 is separated from the sliding block 200. In this way, two stop blocks 300 may be fixed on the guide rail 100, and the reciprocating movement structure 400 is used to drive the guide rail 100 and the stop blocks 100 to move reciprocally together, thereby pushing the sliding block 200 to move intermittently during the reciprocating movement. As shown in FIGS. 7 and 8, a straight first gear 610 is provided at an upper end of the sliding block 200, the first gear 610 is engaged with a second gear 620 (circular gear), the rotation of the second gear 620 is used to provide resistance to hinder the movement of the sliding block 200, and the second guide rail 500 parallel to the guide rail 100 is provided to guide the movement of the guide rail 100.

In addition, in some embodiments, a distance between the two stop blocks 300 may be adjusted. For example, in FIGS. 1 and 2, the two stop blocks 300 are detachably fixed on the support rod 330. For another example, in FIG. 7, the two stop blocks 300 are detachably fixed on the guide rail 100, and the dwell time can be adjusted by adjusting the distance between the two stop blocks 300.

Figure 9:
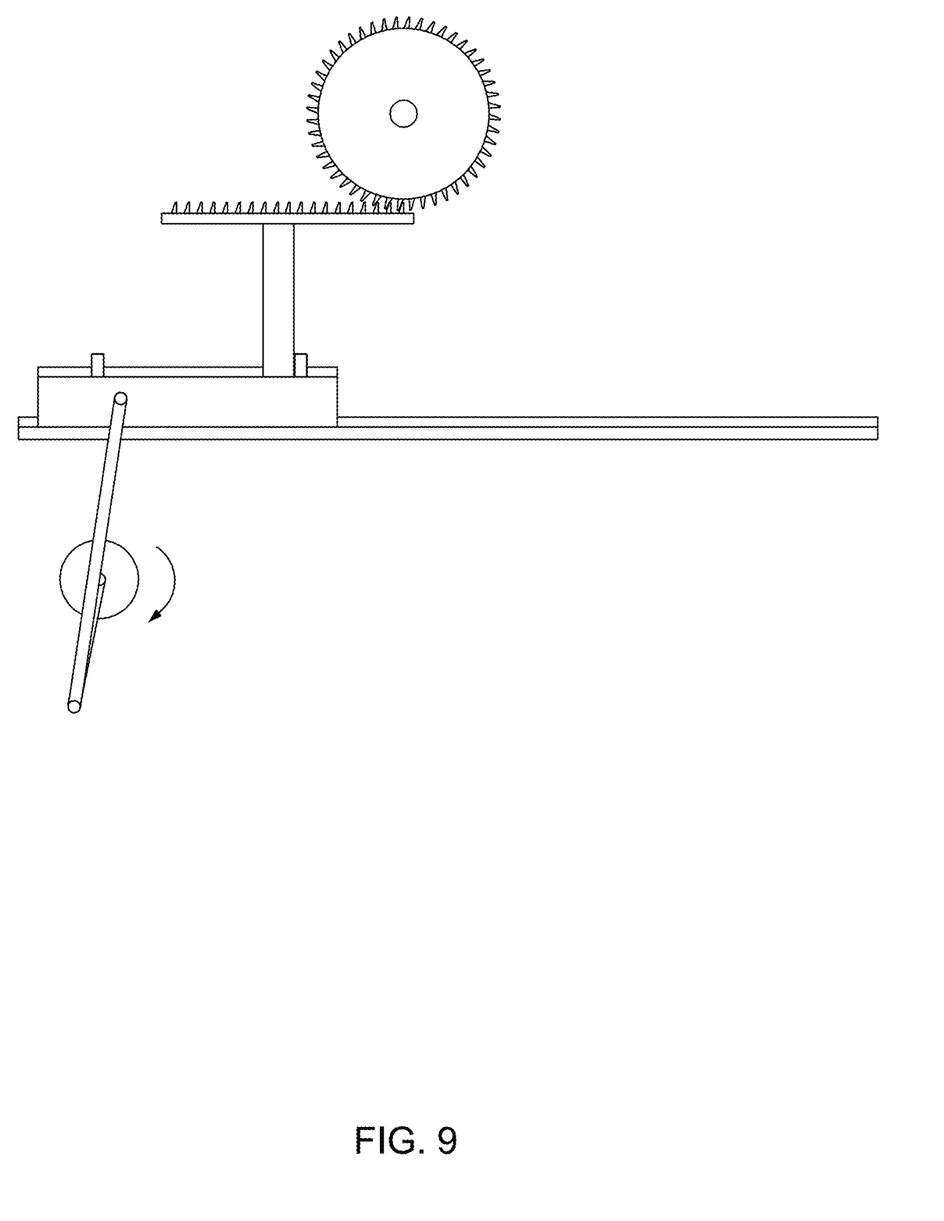
FIG. 9 is a schematic diagram of an initial state in which a stop block of an intermittent moving structure in FIG. 7 moves rightward.
Figure 10:
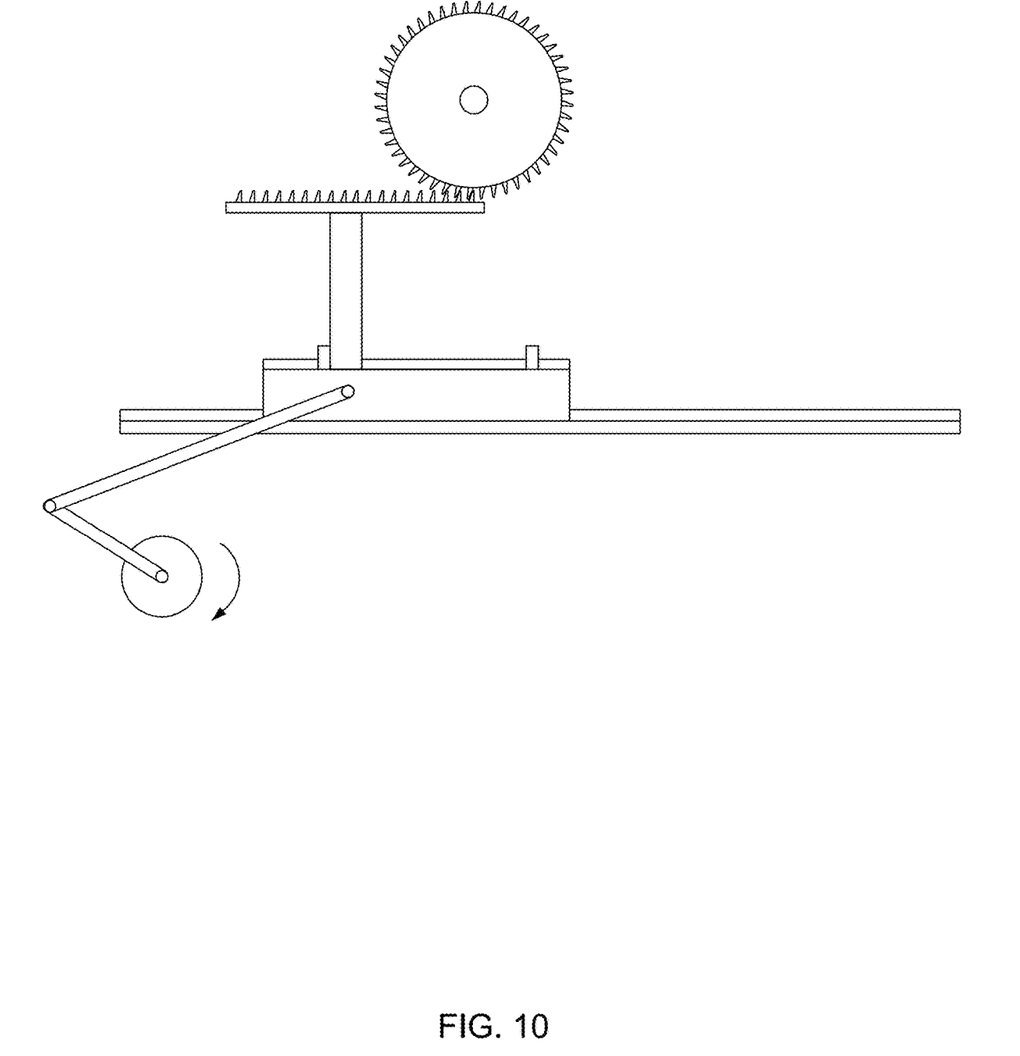
FIG. 10 is a schematic diagram of a state in which a stop block of an intermittent moving structure moves rightward to abut against a sliding block in FIG. 7.
Figure 11:
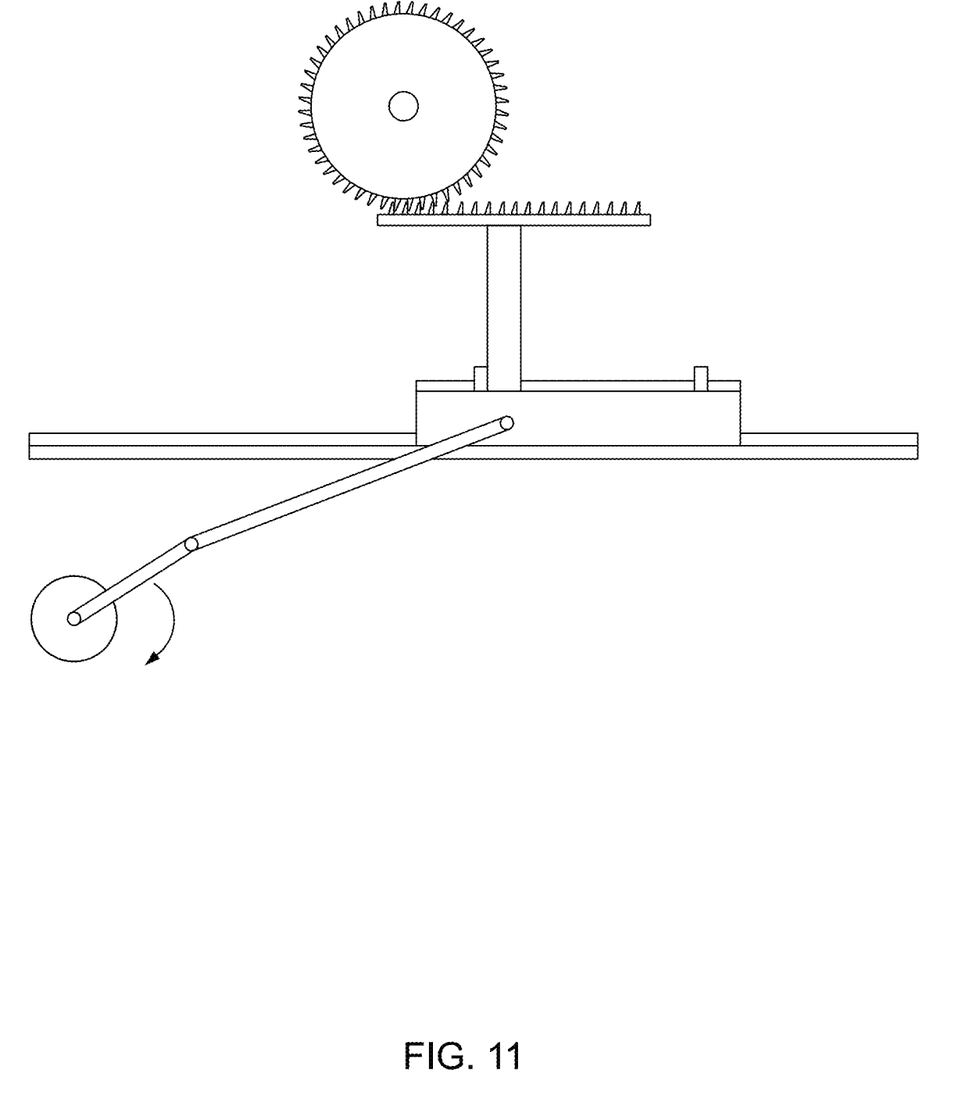
FIG. 11 is a schematic diagram of a state in which a stop block of an intermittent movement structure in FIG. 7 drives a sliding block to move rightward.

The reciprocating movement structure 400 of the present invention belongs to the existing equipment. The existing eccentric wheel structure and crankshaft structure are commonly used in reciprocating motion. Of course, other similar structures are also suitable for the present invention, such as the structure shown in FIG. 1, FIG. 2 and FIG. 7, which includes a motor 410, a first hinge rod 420 and a second hinge rod 430, wherein the first hinge rod 420 is radially arranged along a rotating shaft of the motor 410 and is fixedly connected thereto, one end of the second hinge rod 430 is hinged with the first hinge rod 420, and the other end is hinged with the support rod 330; therefore, when the motor 410 operates, the first hinge rod 420 is driven to rotate, and the second hinge rod 430 drives the two stop blocks 300 to move reciprocally, as shown in FIGS. 9 to 11.

Figure 12:
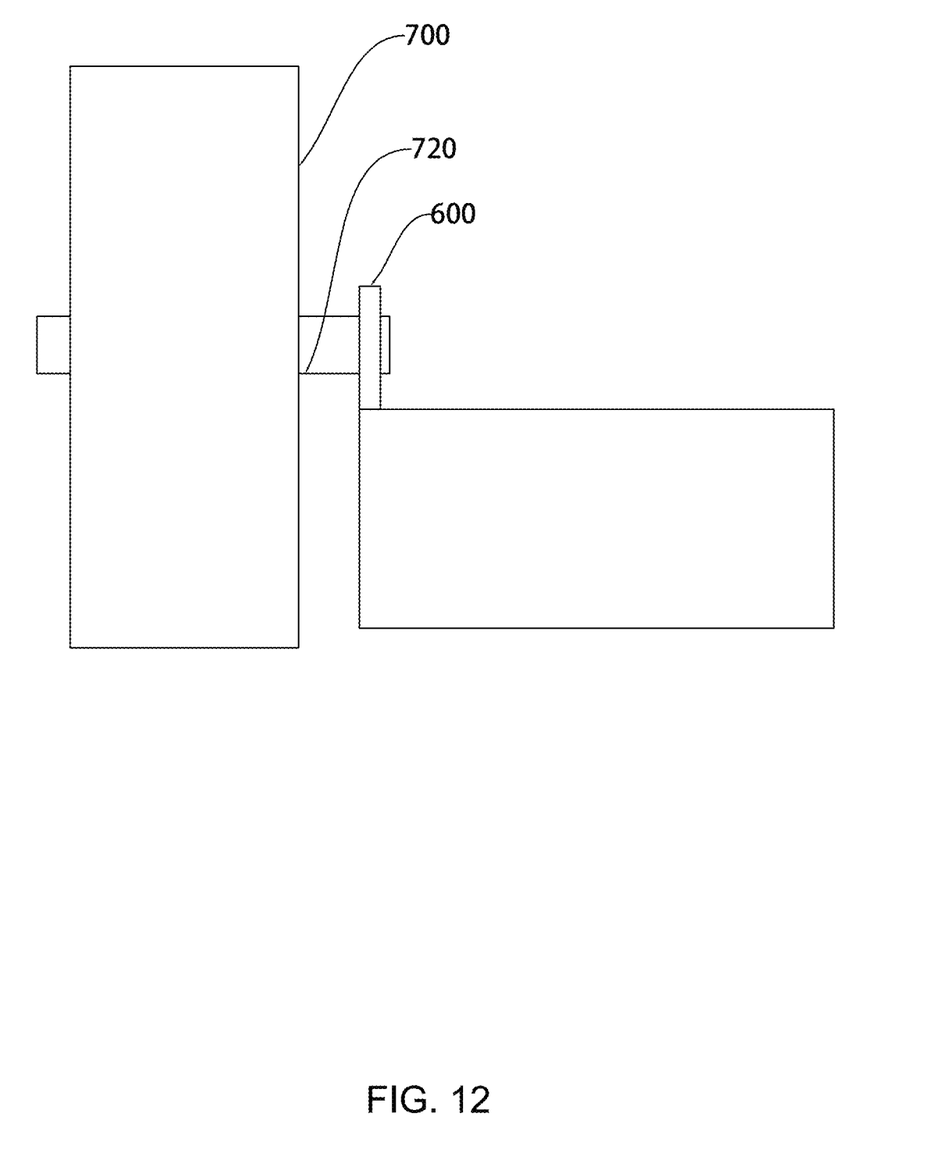
FIG. 12 is a schematic diagram of an overall structure of a diversion device according to the present invention.
Figure 13:
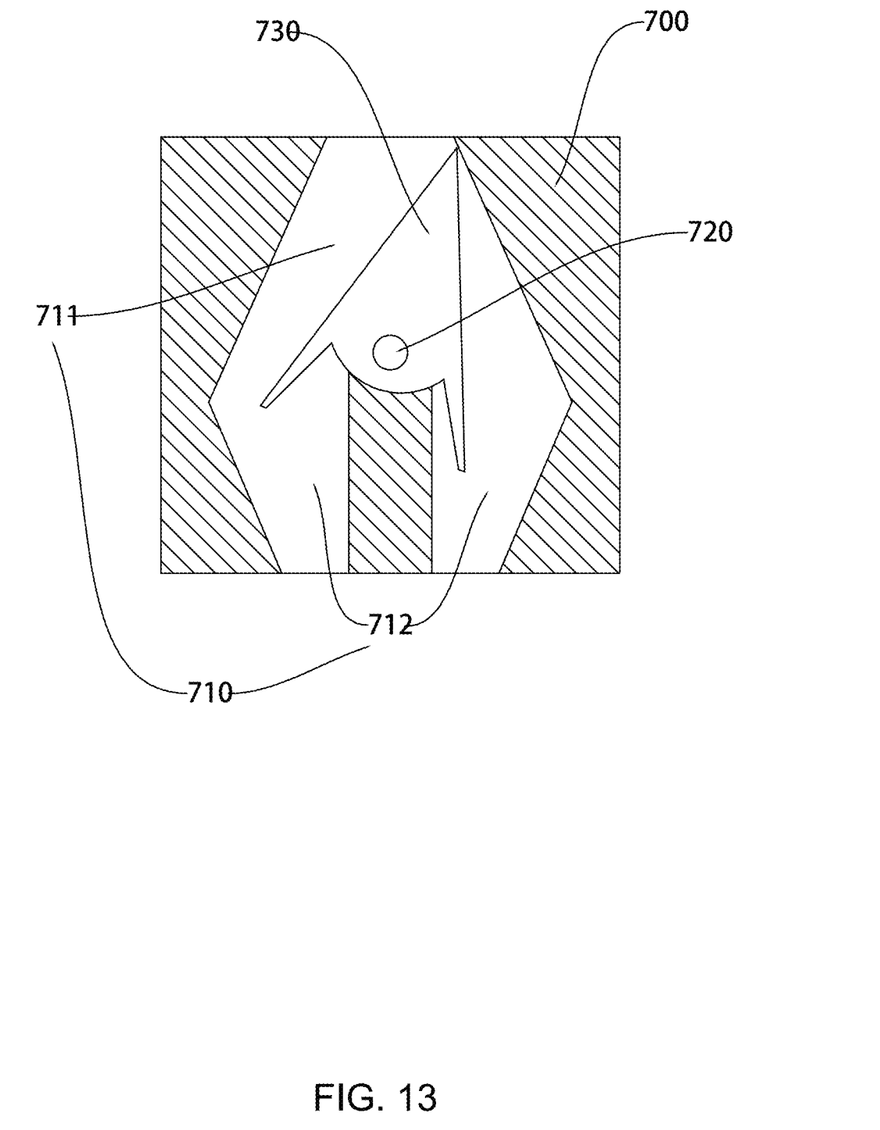
FIG. 13 is a cross-sectional view of a diversion device according to the present invention.
Figure 14:
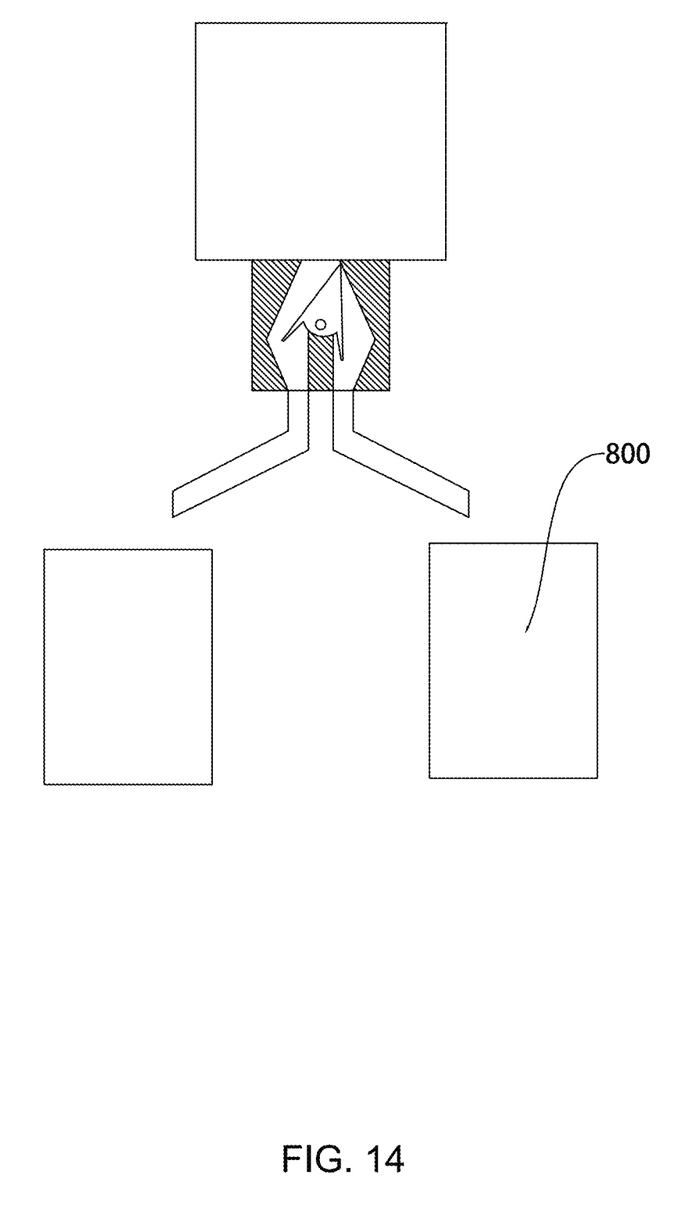
FIG. 14 is a schematic structural diagram of a diversion device according to the present invention for feeding an intermittent reaction kettle.

The intermittent structure of the present invention may be used in various intermittent devices for intermittently and cyclically performing certain operations, such as the intermittent diversion device shown in FIGS. 12 and 13, which includes a shell 700, a Y-shaped passage 710 is provided in the shell 700, the Y-shaped passage 710 includes a main pipe 711 and two branch pipes 712 communicated with the main pipe 711, an adjusting shaft 720 is arranged at a junction of the main pipe 710 and the branch pipes 712, the adjusting shaft 720 passes through the shell 700 and is in a rotatable sealing connection with the shell 700, one end of the adjusting shaft 720 positioned outside the shell 700 is connected to an intermittent moving structure, and the adjusting shaft 720 is driven to intermittently rotate forward and backward by the intermittent moving structure. A conical valve core 730 is fixedly connected to the adjusting shaft 720, and the adjusting shaft 720 can drive the conical valve core 730 to rotate, so that the main pipe 711 and the two branch pipes 712 are intermittently and cyclically communicated. That is, when the adjusting shaft 720 is rotated forward to a limit position, the main pipe 711 is communicated with a first branch pipe, and the passage between the main pipe and the second branch pipe is closed; and when the adjusting shaft 720 is rotated backward to a limit position, the main pipe 711 is communicated with the second branch pipe, and the passage between the main pipe and the second branch pipe is closed. After the main pipe 711 and each branch pipe 712 are connected, these pipes are left for a certain period of time, which is used to load fluid. For example, as shown in FIG. 14, the diversion device is used to add fluid to two intermittent reaction kettles 800.

The above descriptions are merely preferred specific embodiments of the present invention, however, the protection scope of the present invention is not limited thereto, and any modifications and substitutions that can be easily conceived by those skilled in the art within the technical scope disclosed by examples of the present invention shall fall within the protection scope of the present invention.

What is claimed is:

1. An intermittent moving mechanism, comprising:
   a guide rail;
   a sliding block moving along the guide rail;
   two stop blocks arranged at intervals, wherein a distance between the two stop blocks is greater than a length of the sliding block along an extension direction of the guide rail, and the sliding block is positioned between the two stop blocks; and
   a reciprocating movement structure, configured to push the two stop blocks to move synchronously and reciprocally along an extension direction of the guide rail.

2. The intermittent moving mechanism according to claim 1, further comprising a damping component configured to hinder movement of the sliding block, wherein a resistance applied to the sliding block by the damping component is less than a thrust applied to the sliding block by the stop block after abutting against the sliding block and is greater than a friction force between the guide rail and the sliding block, so that the stop block pushes the sliding block to move after abutting against the sliding block, and the sliding block is stationary after the stop block is separated from the sliding block; and the stop block is fixed on the guide rail.

3. The intermittent moving mechanism according to claim 1, further comprising a second guide rail arranged parallel to the guide rail, wherein the two stop blocks are connected into a whole by a rigid support rod, and the two stop blocks move along the second guide rail together with a connecting body of the support rod.

4. The intermittent moving mechanism according to claim 1, wherein the two stop blocks are connected into a whole by a rigid support rod, and the two stop blocks move along the guide rail together with a connecting body of the support rod.

5. The intermittent moving mechanism according to claim 1, wherein a distance between the two stop blocks can be adjusted.

6. An intermittent diversion device, comprising:
   a shell, wherein a Y-shaped passage is provided in the shell, and the Y-shaped passage comprises a main pipe and two branch pipes communicated with the main pipe;
   an adjusting shaft positioned at a junction of the main pipe and the branch pipe, wherein the adjusting shaft passes through the shell and is in a rotatable sealing connection with the shell;
   an intermittent moving structure connected to one end of the adjusting shaft positioned outside the shell, and configured to drive the adjusting shaft to intermittently rotate forward and backward, wherein the intermittent moving structure is the intermittent moving mechanism according to claim 1; and
   a conical valve core fixedly connected to the adjusting shaft, wherein the conical valve core rotates synchronously with the adjusting shaft, so that the main pipe and the two branch pipes are intermittently and cyclically communicated.

\* \* \* \* \*